(12) United States Patent
Olivadoti

(10) Patent No.: US 7,763,338 B2
(45) Date of Patent: Jul. 27, 2010

(54) RETAINING APPARATUS FOR PET WASTE PAD

(76) Inventor: Rick Olivadoti, 290 Riverside Dr., Apt 3C, New York, NY (US) 10025

( * ) Notice: Subject to any disclaimer, the term of this patent is extended or adjusted under 35 U.S.C. 154(b) by 0 days.

(21) Appl. No.: 10/139,155

(22) Filed: May 3, 2002

(65) Prior Publication Data

US 2003/0031824 A1 Feb. 13, 2003

Related U.S. Application Data

(60) Provisional application No. 60/288,957, filed on May 4, 2001.

(51) Int. Cl.
*B32B 1/04* (2006.01)

(52) U.S. Cl. ............................ 428/68; 428/99; 428/121; 428/124; 428/126; 428/127; 428/128; 428/194; 428/900; 119/161; 119/165; 119/166; 119/169; 119/170; 5/496; 5/498; 248/309.4; 40/711

(58) Field of Classification Search ................. 428/68, 428/99, 121, 124, 126, 127, 128, 194, 900; 605/358; 119/161, 165, 166, 169, 170; 5/496, 5/498; 40/661.01, 711; 248/309.4
See application file for complete search history.

(56) References Cited

U.S. PATENT DOCUMENTS

| | | | | | |
|---|---|---|---|---|---|
| 3,626,899 | A | * | 12/1971 | Spellman | 119/169 |
| 3,626,900 | A | * | 12/1971 | Failla | 119/161 |
| 3,665,355 | A | * | 5/1972 | Sasaki et al. | 335/306 |
| 4,738,390 | A | * | 4/1988 | Brennan | 229/77 |
| 4,823,943 | A | * | 4/1989 | Chang | 206/5 |
| 5,092,010 | A | * | 3/1992 | Wong | 5/496 |

* cited by examiner

*Primary Examiner*—Jane Rhee

(57) ABSTRACT

A retaining apparatus for retaining a liquid-absorptive sheet includes a lower layer and an upper layer having substantially the same dimensions as the lower layer. Sandwiched between the two layers are first plurality of magnetic members arranged along the perimeter of the lower layer and a second plurality of magnetic members, opposite in polarity to said first plurality of magnetic members, arranged adjacent to the first plurality of magnetic members.

6 Claims, 3 Drawing Sheets

RETAINING APPARATUS FOR PET WASTE PAD

CROSS-REFERENCE TO RELATED APPLICATIONS

This application claims the benefit of U.S. Provisional Patent Application No. 60/288,957, filed May 4, 2001

STATEMENT REGARDING FEDERALLY SPONSORED RESEARCH OR DEVELOPMENT

Not Applicable

BACKGROUND OF THE INVENTION

1. Field of the Invention

The present invention relates to an apparatus for securely retaining absorbent sheets or pads for use in collecting and disposing of pet wastes. In particular, the present invention relates to a device for securely retaining a disposable, absorbent sheet in a leakproof reservoir.

2. Description of Related Art

Many devices have been proposed to aid in housebreaking of pets and, in particular, dogs. When indoors, it is desirable for the nets to urinate and defecate at a single, predetermined location. Several methods and devices have been proposed to provide a disposable waste collector at the predetermined location.

Traditionally, newspapers have been laid on the floor for a dog's use. Although newspapers are absorbent, unrestrained newspapers can easily scatter when exposed to drafts or can be scattered or torn by a playful or destructive animal. Another drawback of newspapers is that they readily leak through to the floor surface upon which they are laid.

To eliminate the leaking problem, several absorbent pads have been proposed. U.S. Pat. Nos. 3,626,899; 4,800,677; and 5,630,376 all describe collection pads including at least one layer of absorbent material and a backing layer of material that is impervious to fluid so as to preclude urine from leaking through the pad to the surface of the floor. However, although these devices can preclude fluid leakage, when unrestrained, they, too, can be readily scattered or torn by drafts or pets.

U.S. Pat. No. 4,949,673 proposes a chamber pot for pets in which a water-absorptive sheet can be laid over a soil bed surrounded by peripheral walls. The water-absorptive sheet is drawn out of a roll, cut and laid on the soil bed. A presser frame hinged to the soil bed is then lowered and engaged with a locking device. The bottom face of the presser frame presses and clamps the periphery of the sheet placed on the soil bed. However, the chamber pot requires a complicated structure in order to retain the absorptive sheet in a tray. This can lead to higher costs and a complicated manufacturing process. Further, because there is only a single line of peripheral contact between the presser frame and the periphery of the absorptive sheet, a pet can readily dislodge the absorptive sheet from the frame.

U.S. Pat. No. 4,715,320 relates to a sanitary receptacle for animal waste that is formed of three concentric hoops and a sheet of thin flexible material, such as newspaper. The newspaper is spread over the inner hoop and then captured in an annular space between the inner and center hoops when the center hoop is placed over the newspaper and the center hoop, thereby capturing the newspaper between the center and outer hoops. However, in this device nothing is disposed between the newspaper and the floor, so animal waste can leak through to the floor surface. Further, assembly of the device is complex, requiring multiple steps to secure the newspaper within the three hoops.

U.S. Pat. No. 6,059,247 represents the state-of-the art in this field, and describes a pad holder that includes a base that receives the absorptive sheet and a securing member. The base has an upstanding wall which is received by a recessed wall in the securing member to establish peripheral pressure content to hold the absorptive sheet. Thus, the '247 device provides an elegant and effective mechanism for holding a pet waste pad in place, and solves the problems of the prior art discussed above.

Despite its advantages, however, the '247 device is constructed of a rigid material, such as formed or molded plastic. As such, it may be less than optional which one is traveling with one's pet, since its rigid structure can make it difficult to pack.

This is a need, therefore, for a pad holder that takes a new and finished approach, and provides even greater advantages and flexibility to pet owners.

BRIEF SUMMARY OF THE INVENTION

It is, therefore, an object of the present invention to provide a leak-proof apparatus for securely and reliably retaining a disposable, absorptive sheet for receiving pet waste matter.

It is another object of the present invention to provide a low-cost apparatus of simple design and ease of manufacture for securely retaining such disposable, absorptive sheets.

It is still another object of the present invention to provide an easily-assembled apparatus for securely retaining such disposable, absorptive sheets.

It is yet another object of the present invention to provide a device for securely retaining such disposable, absorptive sheets and for preventing the sheets from being dislodged or damaged by the pet.

It is yet another object of the present invention to provide a retaining apparatus that is portable and may be compacted for storage.

In accordance with one aspect of the present invention, an apparatus for retaining a liquid-absorptive sheet includes a lower layer; a first plurality of magnetic members arranged on top of the lower layer along the perimeter of the lower layer; a second plurality of magnetic members, opposite in polarity to the first plurality of magnetic members, and arranged on top of the lower layer and adjacent to the first plurality of magnetic members; and an upper layer disposed having substantially the same dimensions as the lower layer, said upper layers disposed on top of the first and second pluralities of magnetic members such that the first and second pluralities of magnetic members are sandwiched between the lower layer and said upper layer.

DETAILED DESCRIPTION OF THE PREFERRED EMBODIMENTS

Figure 1:
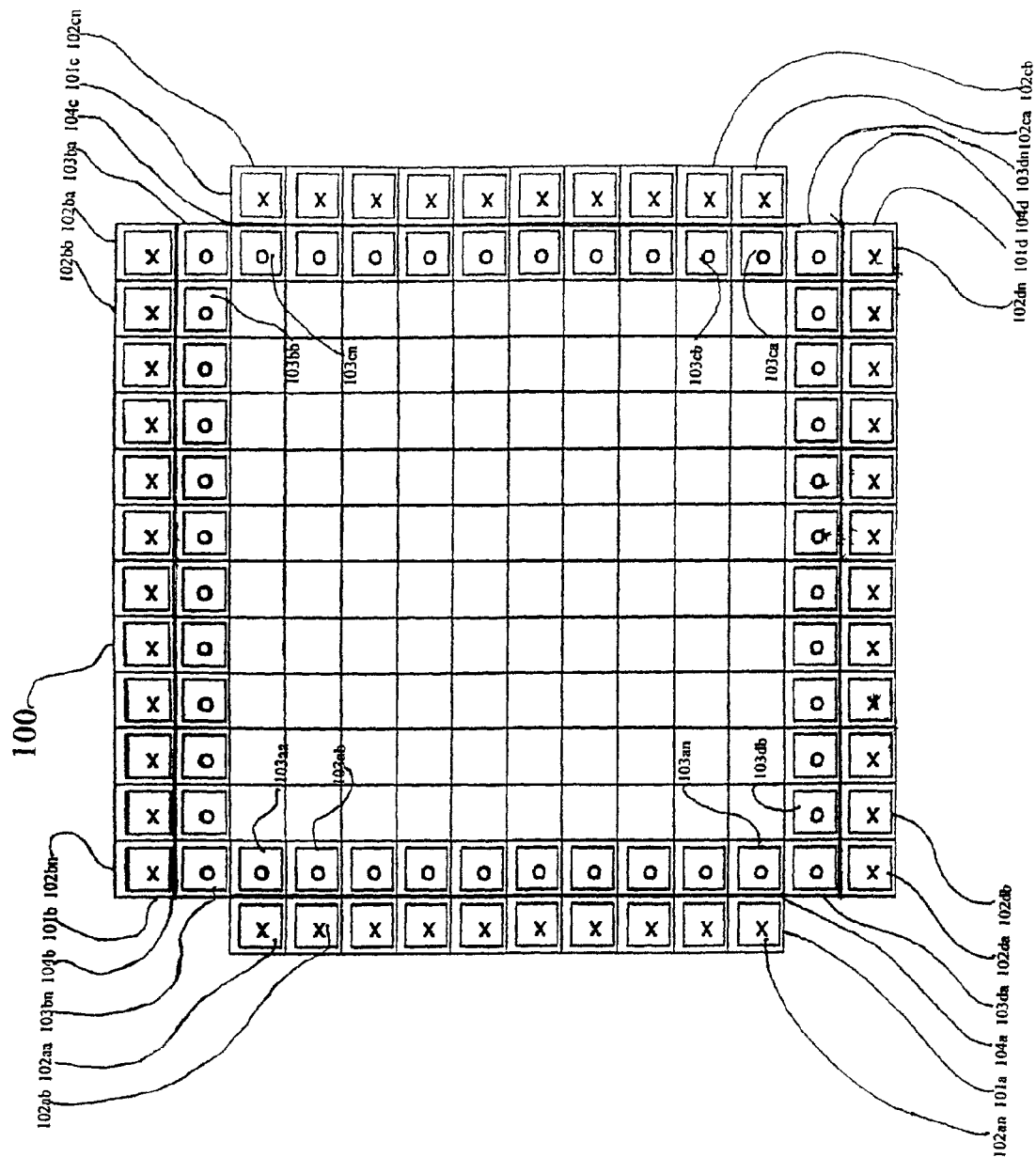
FIG. 1 is a top view of one embodiment of the retaining apparatus of the present invention.

FIG. 1 depicts a retaining apparatus 100 for securing a pet waste pad in accordance with one preferred embodiment of the present invention. The apparatus 100 is constructed from two identical sheets of a moisture-proof fabric, such as for example vinyl or the like. The shape of each sheet in this embodiment is generally square, with each corner of the square having a rectangular notch cut out, to create a final having flaps 101a through 101d on each side. As is shown in FIG. 1, the length of each of the two of the opposing flaps 101a and 101c is less than the length of a side of the original square; while the length of each of the other of the two opposing flaps 101b and 101d is the same as the length of a side of the original square. This configuration accommodates the folding up of each flap, as will be described in greater detail below.

In constructing the retaining apparatus 100, a bottom sheet of moisture proof fabric is laid flat. Then, a plurality of magnetic members 102aa through 102an; 102ba through 102bn; 102ca through 102cn; and 102da through 1-2dn, are arranged upon each of the flaps 101a, 102b, 102c and 102d. Each of the magnetic members 102 is marked in FIG. 1 with an "x", to indicate its polarity. In the embodiment of FIG. 1, there are multiple magnetic members on each flap. The magnetic members may have any suitable shape, such as, for example, square (as shown), round or strip-shaped. It would also be possible to utilize a single, longer strip-shaped magnetic member for each flap.

In any event, each magnet member may comprise a strip magnet and a metal backing pressed against its downward facing side. The metal backing, which may be for example steel, functions to increase the strength of attraction of the magnetic member. Ceramic magnets or core magnets might also be used, and in such a case no metal backing is necessary.

Next, a plurality of magnetic members 103aa through 103an; 103ba through 103bn; 103ca through 103cn; and 103da through 103dn; are disposed upon the sheet adjacent to the magnetic members 102. Each of the magnetic members 103 is marked in FIG. 1 with an "o", to indicate that they are opposite in polarity to the magnetic members 102, such that the upward facing sides of the magnetic members 102 and the magnetic members 103 attract. Preferably, the magnetic members 103 will correspond on a one-for-one basis with the magnetic members 102, and will have the same shape as the magnetic members 102 (as is shown). However, such a correspondence is not strictly necessary. For example, the magnetic members 102 might comprise a single, strip-shaped member for each flap, while the magnetic members 103 might comprise a plurality of smaller, square-shaped members corresponding to each strip-shaped member 102. Other variations are possible as well.

Once the magnetic members 102 and 103 are placed, an upper sheet of moisture-proof fabric, preferably having dimensions substantially the same as the bottom sheet, is laid on top of the bottom sheet, such that the magnetic members 102 and 103 are sandwiched between the two sheets. Then, a heated metal die is applied to the arrangement, to create a heat seal that fuses the perimeters of the two sheets. The metal die should be cut such that heat sealed hinges 104a, 104b, 104c and 104d are created between the magnetic members 102a and 103a, 102b and 103b, 102c and 103c and 102d and 103d. The metal die might be further cut to create a heat sealed quilting (indicated by the grid pattern shown in FIG. 1), to provide added stability and facilitate the folding of the retaining apparatus 100, for storage, travelling and the like.

It should be noted that, provided the magnetic members 102 are strong enough, the magnetic members 103 might be replaced by non-magnetic members to which magnetic members attract. Such non-magnetic members, which may be for example a metal such as steel could be of any suitable shape. As another alternative, strong magnetic members 103 might be used, and the magnetic members 102 could be replaced by non-magnetic members of the type described above.

Figure 2:
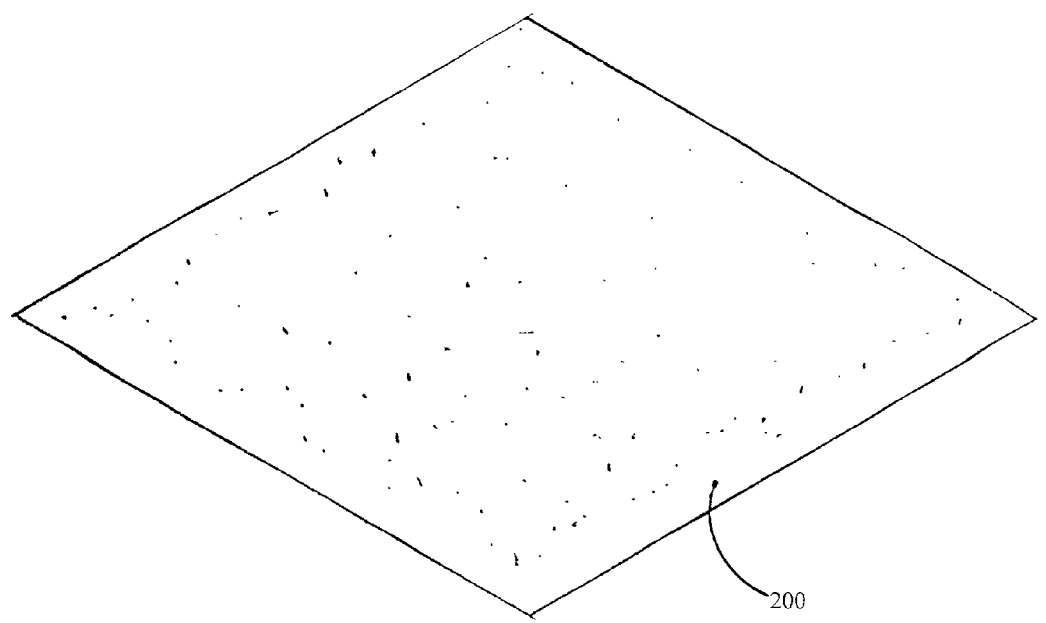
FIG. 2 illustrates a pet waste pad being fit into the retaining apparatus of the present invention.
Figure 2:
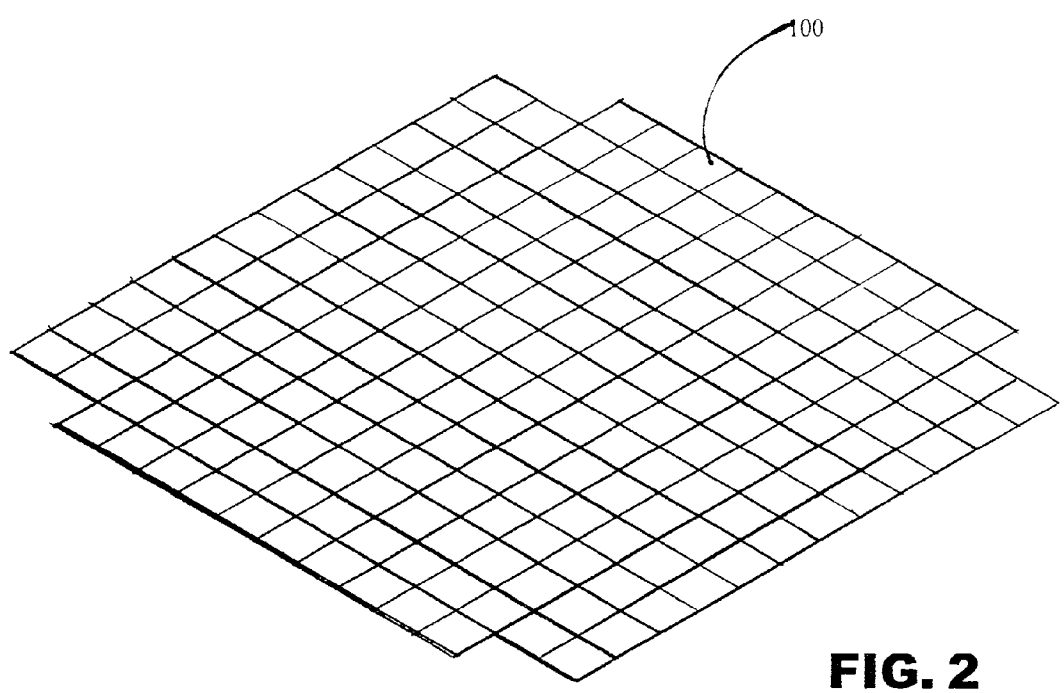
Figure 3:
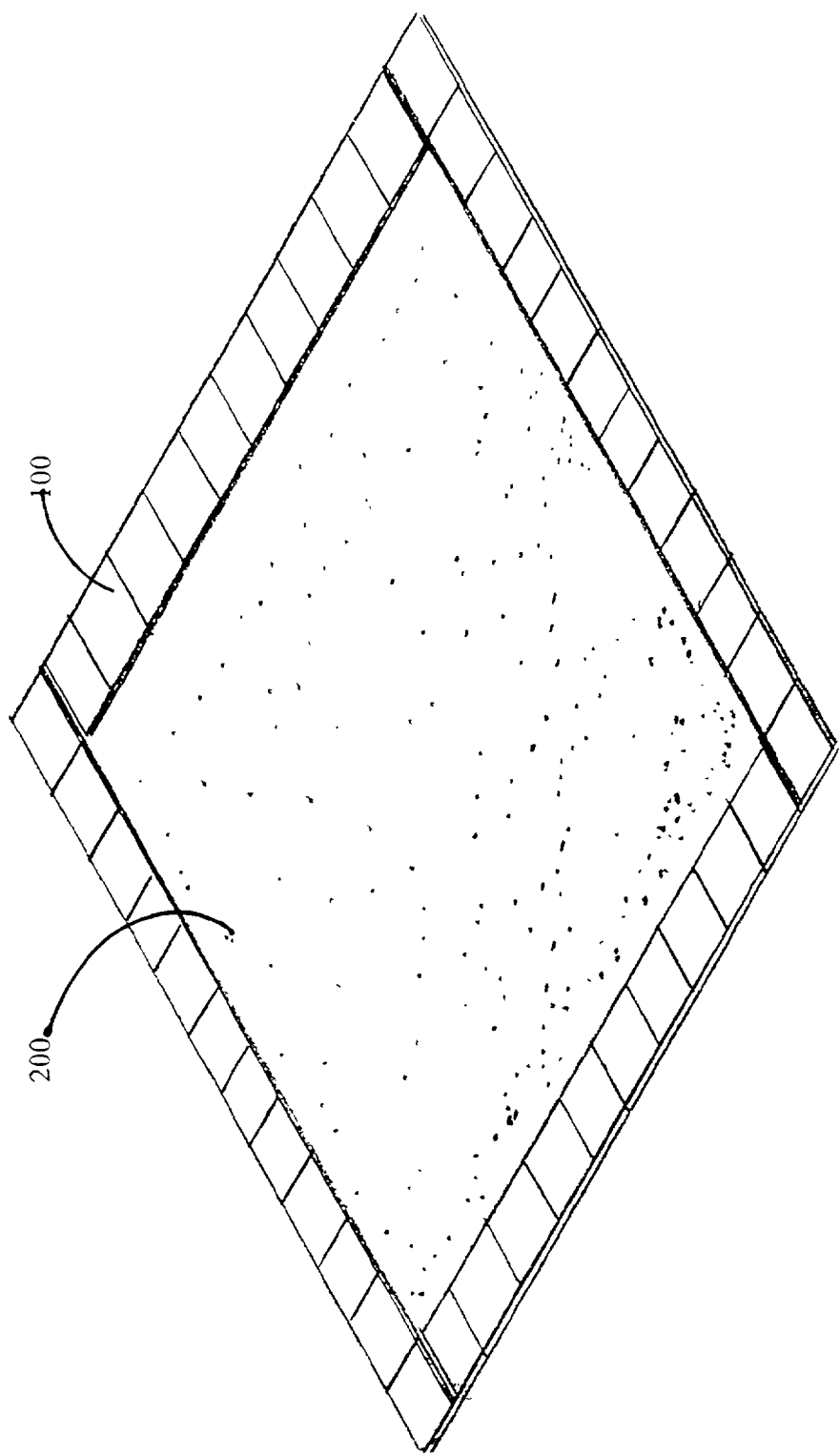
FIG. 3 illustrates a pet waste pad secured by the retaining apparatus of the present invention.

FIG. 2 indicates a pet waste pad 200 being fit into the retaining apparatus 100, while FIG. 3 illustrates the retaining apparatus 100 holding the pad 200 in place. In such a position, the flaps 101 have their bottom sides facing upward, and are covering the outer edges of the pad 200. The vast majority of the pad 200, however, is exposed and available for use.

Although illustrative embodiments of the present invention have been described herein in connection with the accompanying drawings, it is to be understood that this invention is not limited to these embodiments and that various changes and modifications may be erected therein by those skilled in the art without departing from the spirit of the invention. For example, the upper sheet is not strictly necessary, and the apparatus could be constructed by affixing the magnetic members to the lower sheet with an adhesive, rivets or other securing methods. Other variations are possible as well.

What we claim is:

1. A liquid-absorptive system, comprising: a liquid-absorptive sheet;
a retaining apparatus for retaining the liquid-absorptive sheet the apparatus including:
a lower layer;
a first plurality of magnetic members arranged on top—of said lower layer along the perimeter of said lower layer;
a second plurality of magnetic members arranged on top of said lower layer adjacent to said first plurality of magnetic members;
an upper layer having substantially the same dimensions as said lower layer, said upper layer disposed on top of said first and second pluralities of magnetic members such that said first and second pluralities of magnetic members are sandwiched between said lower layer and said upper layer, further comprising a heat sealed hinge between the first plurality of magnetic members and the second plurality of magnetic members wherein the lower layer and the upper layer may be folded along the hinge to allow the first plurality of magnetic members and the second plurality of magnetic members to attract, wherein the upward facing sides of the magnetic members in said first plurality and the upward facing sides of the magnetic members in said second plurality exert a magnetic attraction with respect to one another to retain the liquid-absorptive sheet in place.

2. A system according to claim 1, wherein said upper layer and said lower comprise a moisture-proof fabric.

3. A system according to claim 2, wherein the moisture-proof fabric is vinyl.

4. A system according to claim 1, wherein the magnetic members are selected from the group consisting of core magnets, ceramic magnets and strip magnets having a metal backing.

5. A system according to claim 1, further comprising a heat seal fusing the perimeters of said lower layer and said upper layer.

6. A system according to claim 1, wherein the magnetic members are selected from the group consisting of core magnets, ceramic magnets and strip magnets having a metal backing.

* * * * *